United States Patent
Distefano (10) Patent No.: US 12,319,593 B2
(45) Date of Patent: Jun. 3, 2025

(54) SORBENTS HAVING HIGH VOLUMETRIC IODINE AND MOLASSES VALUES FOR REMOVAL OF PFAS FROM FLUIDS AND METHODS OF MAKING AND USING THE SAME

(71) Applicant: CALGON CARBON CORPORATION, Moon Township, PA (US)

(72) Inventor: Rebecca L. Distefano, Oakdale, PA (US)

(*) Notice: Subject to any disclaimer, the term of this patent is extended or adjusted under 35 U.S.C. 154(b) by 0 days.

(21) Appl. No.: 17/375,631

(22) Filed: Jul. 14, 2021

(65) Prior Publication Data

US 2022/0017386 A1    Jan. 20, 2022

Related U.S. Application Data

(60) Provisional application No. 63/051,637, filed on Jul. 14, 2020.

(51) Int. Cl.
| | | |
|---|---|---|
| *C02F 1/28* | (2023.01) | |
| *B01D 53/02* | (2006.01) | |
| *C02F 1/58* | (2023.01) | |
| *C02F 101/36* | (2006.01) | |

(52) U.S. Cl.
CPC ............ *C02F 1/281* (2013.01); *B01D 53/02* (2013.01); *C02F 1/58* (2013.01); *B01D 2253/102* (2013.01); *C02F 2101/36* (2013.01)

(58) Field of Classification Search
CPC . B01J 20/12; B01J 20/14; B01J 20/165; B01J 2220/4825; B01J 2220/4837; B01J 20/20; B01J 20/28011; B01J 20/3028; C02F 1/281; C02F 1/58; C02F 2101/36; B01D 53/02; B01D 2253/102
See application file for complete search history.

(56) References Cited

U.S. PATENT DOCUMENTS

| | | | |
|---|---|---|---|
| 2,038,071 | A | 4/1936 | Wilhelm |
| 3,713,281 | A | 1/1973 | Asker et al. |
| 3,757,488 | A | 9/1973 | Austin et al. |

(Continued)

FOREIGN PATENT DOCUMENTS

| | | |
|---|---|---|
| CA | 2485103 A1 | 11/2003 |
| CN | 108940191 A | 12/2018 |

(Continued)

OTHER PUBLICATIONS

McNamara, J.D., Franco, R., Mimna, R. and Zappa, L., 2018. Comparison of activated carbons for removal of perfluorinated compounds from drinking water. Journal-American Water Works Association, 110(1), pp. E2-E14. (Year: 2018).*

(Continued)

*Primary Examiner* — Jason M Greene
*Assistant Examiner* — Bernadette Karen Mcgann
(74) *Attorney, Agent, or Firm* — DLA Piper LLP (US)

(57) ABSTRACT

The disclosure provides sorbents and sorbents that improve the adsorption of per- and polyfluoroalkyl substances (PFAS). The sorbents and sorbents have microstructures that efficiently adsorb PFAS, as shown by the combination of high volumetric iodine number and high volumetric molasses number. Methods of manufacturing and methods of use are further provided.

16 Claims, 3 Drawing Sheets

(56) References Cited

U.S. PATENT DOCUMENTS

| | | | |
|---|---|---|---|
| 3,876,505 A | 4/1975 | Stoneburner | |
| 4,144,193 A | 3/1979 | Murty | |
| 4,331,639 A | 5/1982 | Hass et al. | |
| 4,624,937 A | 11/1986 | Chou | |
| 4,921,826 A | 5/1990 | Juntgen et al. | |
| 5,016,628 A | 5/1991 | Lambert | |
| 5,248,395 A | 9/1993 | Rastelli et al. | |
| 5,322,778 A | 6/1994 | Antrim et al. | |
| 5,338,458 A | 8/1994 | Carrubba et al. | |
| 5,348,755 A | 9/1994 | Roy | |
| 5,352,274 A | 10/1994 | Blakley | |
| 5,356,849 A | 10/1994 | Matviya et al. | |
| 5,500,038 A | 3/1996 | Dauber et al. | |
| 5,504,050 A | 4/1996 | Hayden | |
| 5,598,721 A | 2/1997 | Rockenfeller et al. | |
| 5,754,002 A | 5/1998 | Haitko et al. | |
| 5,821,682 A | 10/1998 | Foust et al. | |
| 5,861,050 A | 1/1999 | Pittel et al. | |
| 6,176,897 B1 | 1/2001 | Keefer | |
| 6,186,939 B1 | 2/2001 | Forrester | |
| 6,342,129 B1 | 1/2002 | Vaughn et al. | |
| 6,406,523 B1 | 6/2002 | Connor et al. | |
| 6,599,856 B1 | 7/2003 | Uchino et al. | |
| 6,699,393 B2 | 3/2004 | Baker et al. | |
| 6,706,194 B2 | 3/2004 | Baker et al. | |
| 6,848,374 B2 | 2/2005 | Srinivasachar et al. | |
| RE38,844 E | 10/2005 | Hiltzik et al. | |
| 7,077,891 B2 | 7/2006 | Jaffe et al. | |
| 7,222,612 B2 | 5/2007 | Hagler et al. | |
| 7,278,406 B2 | 10/2007 | Hagler | |
| 7,361,280 B2 | 4/2008 | Baker | |
| 7,547,350 B2 | 6/2009 | Callahan et al. | |
| 7,666,507 B2 | 2/2010 | Ishikawa et al. | |
| 7,704,305 B2 | 4/2010 | Nishida | |
| 7,780,765 B2 | 8/2010 | Srinivasachar et al. | |
| 7,858,061 B2 | 12/2010 | Varma et al. | |
| 7,862,725 B2 | 1/2011 | Mazyck et al. | |
| 7,879,136 B2 | 2/2011 | Mazyck | |
| 7,923,410 B2 | 4/2011 | Turk et al. | |
| 8,034,163 B1 | 10/2011 | Durham et al. | |
| 8,042,524 B2 | 10/2011 | Elum et al. | |
| 8,057,576 B1 | 11/2011 | Pollack | |
| 8,069,797 B2 | 12/2011 | Srinivasachar et al. | |
| 8,080,088 B1 | 12/2011 | Srinivasachar | |
| 8,168,147 B2 | 5/2012 | Olson et al. | |
| 8,263,524 B1 | 9/2012 | Skandan et al. | |
| 8,864,877 B2 | 10/2014 | Nishita et al. | |
| 9,120,079 B1 | 9/2015 | Dietz et al. | |
| 9,174,205 B2 | 11/2015 | Reimerink-Schats et al. | |
| 9,199,862 B2 | 12/2015 | Kuramitsu et al. | |
| 9,732,649 B2 | 8/2017 | Hiltzik et al. | |
| 10,155,673 B2 | 12/2018 | Stouffer et al. | |
| 10,702,853 B2 | 7/2020 | Mazzoccoli et al. | |
| 11,872,539 B2 | 1/2024 | Mazzoccoli et al. | |
| 11,911,743 B2 | 2/2024 | Distefano et al. | |
| 2002/0170436 A1 | 11/2002 | Keefer et al. | |
| 2003/0188663 A1 | 10/2003 | Barthel et al. | |
| 2004/0118287 A1 | 6/2004 | Jaffe et al. | |
| 2004/0118387 A1 | 6/2004 | Lawrence | |
| 2005/0081717 A1 | 4/2005 | Meiller et al. | |
| 2005/0150835 A1 | 7/2005 | Vo | |
| 2005/0167367 A1 | 8/2005 | Baker | |
| 2006/0042467 A1 | 3/2006 | Maru | |
| 2006/0054142 A1 | 3/2006 | Burke et al. | |
| 2007/0169758 A1 | 7/2007 | Mills | |
| 2007/0272080 A1 | 11/2007 | Allen et al. | |
| 2008/0073290 A1 | 3/2008 | Ryan et al. | |
| 2008/0121142 A1 | 5/2008 | Comrie et al. | |
| 2008/0283446 A1 | 11/2008 | Tatarchuk et al. | |
| 2008/0308075 A1 | 12/2008 | Allen et al. | |
| 2009/0172998 A1 | 7/2009 | Harris et al. | |
| 2009/0223370 A1 | 9/2009 | Kosugi et al. | |
| 2010/0178624 A1 | 7/2010 | Srinivasachar | |
| 2011/0030592 A1 | 2/2011 | Baldrey et al. | |
| 2011/0076210 A1 | 3/2011 | Pollack et al. | |
| 2012/0048110 A1 | 3/2012 | Dawes et al. | |
| 2012/0100054 A1 | 4/2012 | Durham et al. | |
| 2012/0172216 A1 | 7/2012 | Bohringer et al. | |
| 2012/0220451 A1 | 8/2012 | Miyata et al. | |
| 2013/0078169 A1 | 3/2013 | LaFlesh et al. | |
| 2013/0109562 A1 | 5/2013 | Wong et al. | |
| 2013/0168321 A1 | 7/2013 | Cannon et al. | |
| 2013/0269532 A1 | 10/2013 | Kimoto | |
| 2013/0316433 A1 | 11/2013 | Huang | |
| 2014/0112856 A1 | 4/2014 | Krutka et al. | |
| 2014/0117054 A1 | 5/2014 | Ryan et al. | |
| 2014/0165542 A1 | 6/2014 | Loftin et al. | |
| 2014/0336568 A1 | 11/2014 | Wong | |
| 2015/0050202 A1 | 2/2015 | Filippelli et al. | |
| 2016/0023920 A1 | 1/2016 | Doyle et al. | |
| 2016/0166972 A1 | 6/2016 | Owens et al. | |
| 2016/0167982 A1 | 6/2016 | Stouffer et al. | |
| 2016/0236169 A1 | 8/2016 | Doughty et al. | |
| 2016/0271555 A1 | 9/2016 | Hiltzik et al. | |
| 2016/0346723 A1 | 12/2016 | Honore et al. | |
| 2017/0297926 A1 | 10/2017 | Nickelsen et al. | |
| 2018/0030871 A1 | 2/2018 | Hiltzik et al. | |
| 2018/0214816 A1 | 8/2018 | Greenbank | |
| 2019/0201870 A1 | 7/2019 | Kumar Pal et al. | |
| 2019/0247831 A1 | 8/2019 | Tramposch et al. | |
| 2019/0270081 A1 | 9/2019 | Ilinich et al. | |
| 2020/0038798 A1 | 2/2020 | Greenbank et al. | |
| 2020/0039809 A1 | 2/2020 | Greenbank et al. | |
| 2020/0040851 A1 | 2/2020 | Greenbank et al. | |
| 2020/0179902 A1 | 6/2020 | Huang | |
| 2020/0316560 A1 | 10/2020 | Distefano et al. | |

FOREIGN PATENT DOCUMENTS

| | | |
|---|---|---|
| DE | 3620425 C1 | 6/1987 |
| EP | 0023678 A1 | 2/1981 |
| EP | 0433677 A1 | 6/1991 |
| EP | 1413348 A1 | 4/2004 |
| EP | 1521723 A1 | 4/2005 |
| FR | 3077069 A1 | 7/2019 |
| GB | 1336241 A | 11/1973 |
| JP | H-01058331 B2 | 3/1989 |
| JP | 2008023365 A | 2/2008 |
| JP | 2013013899 A | 1/2013 |
| JP | 2018538130 A | 12/2018 |
| KR | 20120074080 A | 7/2012 |
| WO | 8100398 A1 | 2/1981 |
| WO | WO 81/00399 A1 * | 2/1981 |
| WO | 2009031562 A1 | 3/2009 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2013096281 A1 | 6/2013 |
| WO | 2013149241 A1 | 10/2013 |
| WO | 2014082076 A1 | 5/2014 |
| WO | 2014088630 A1 | 6/2014 |
| WO | 2014205200 A1 | 12/2014 |
| WO | 2016185033 A1 | 11/2016 |
| WO | 2017180346 A1 | 10/2017 |
| WO | 2018116842 A1 | 6/2018 |
| WO | 2018144588 A1 | 8/2018 |
| WO | 2018175936 A1 | 9/2018 |
| WO | 2020028703 A2 | 2/2020 |
| WO | 2020028839 A1 | 2/2020 |
| WO | 2020028845 A1 | 2/2020 |

OTHER PUBLICATIONS

H. Sontheimer, J. C. Crittenden, and R. S. Summers, "Activated Carbon for Water Treatment" Second Edition (DVGW-Forschungsstelle, 1988), p. 100-105 (Year: 1988).*

Appleman et al., "Treatment of poly-and perfluoroalkyl substances in U.S. full-scale water treatment systems", Water Research, vol. 51 pp. 246-255 (2014).

"The Chemistry of Nitrogen and Phosphorous." Purdue Chemistry, Purdue University, (2006) chemed.chem.purdue.edu/genchem/topicreview/bp/ch10/group5.php#negative.

(56) References Cited

OTHER PUBLICATIONS

Johnson et al., "Advanced Filtration Membranes for the Removal of Perfluoroalkyl Species from Water", American Chemical Society, ACS Omega, May 2, 2019, vol. 4(5), pp. 8001-8006.

Mcnamara et al., "Comparison of Activated Carbons for Removal of Perfluorinated Compounds From Drinking Water", Article in Journal AWWA, Jan. 2018; Retrieved from Internet on Sep. 22, 2021. url <https://cswab.org/wp-content/uploads/2018/12/Activated-Carbons-Comparison-for-Removal-of-PFAS-in-Drinking-Water-McNamara-2018.pdf>.

Raposo et al., Mercury Speciation in Fluorescent Lamps by Thermal Release Analysis (2003), Waste Management 23(10):879-886.

Sharifi et al., "Formation of Active Sites for Oxygen Reduction Reactions by Transformation of Nitrogen Functionalities in Nitrogen-Doped Carbon Nanotubes." ACS Nano, vol. 6, No. 10, 2012, pp. 8904-8912, doi:10.1021/nn302906r.

Wang et al., "Influence of cations on the partition behavior of perfluoroheptanoate (PFHpA) and perfluorohexanesulfonate (PFHxS) on waste water sludge", Chemosphere, vol. 131, Jul. 2015, pp. 178-183.

Westreich et al., "The removal of short-chain and long-chain perfluoroalkyl acids and sulfonates via granular activated carbons: A comparative column study", Remediation Journal, Dec. 4, 2018; vol. 29(1) pp. 19-26.

Pietrzak et al. "Preparation of Nitrogen-Enriched Activated Carbons from Brown Coal" 2006, Energy & Fuels 20:1275-1280.

Barrios-Bermudez et al. "Fe—Cu Doped Multiwalled Carbon Nanotubes for Fenton-like Degradation of Paracetamol under Mild Conditions" Apr. 14, 2020, Nanomaterials 10(749):1-18.

NORIT Americas Inc, "Datasheet NORIT GAC 830" Dec. 1, 2003, XP055892391, [Retrieved on Feb. 16, 2022], Retrieved from the Internet: URL: www.reskem.com/wp-uploads/2015/04/norit-gac830.pdf, 2 pages.

Xu et al., "Biomass Based Iron and Nitrogen Co-Doped 3D Porous Carbon as an Efficient Oxygen Reduction Catalyst", Journal of Colloid and Interface Science, Mar. 28, 2018, vol. 523, pp. 144-150.

Calgon Carbon Corporation, "Removal of PFAS Precursor Compounds Using GAC", 2018, 36 pages.

Zhang, et al., "Nanostructured iron(III)-copper(II) binary oxide: A novel adsorbent for enhanced arsenic removal from aqueous solutions", Water Research, Mar. 22, 2013, vol. 47, pp. 4022-4031.

* cited by examiner

SORBENTS HAVING HIGH VOLUMETRIC IODINE AND MOLASSES VALUES FOR REMOVAL OF PFAS FROM FLUIDS AND METHODS OF MAKING AND USING THE SAME

CROSS-REFERENCE TO RELATED APPLICATIONS

This application claims the benefit of U.S. Provisional Patent Application No. 63/051,637 filed Jul. 14, 2020, the entirety of which is incorporated by reference herein.

FIELD

The disclosure describes sorbents that have improved performance in removing per- and polyfluoroalkyl substances, including but not limited to PFOA, PFOS, and similar compounds from liquids and gases.

BACKGROUND

Per- and polyfluoroalkyl substances (PFAS) are a group of compounds that include perfluorooctanoic acid (PFOA), perfluorooctanesulfonic acid (PFOS), and compounds produced by the gENX process such as 2,3,3,3-tetrafluoro-2-(heptafluoropropoxy)propanoate and heptafluoropropyl 1,2,2,2-tetrafluoroethyl ether. Such highly fluorinated compounds have enjoyed widespread industrial use for many years, owing to their chemical durability, excellent surfactant properties, and key role as precursors to fluoropolymers including polytetrafluoroethylene.

Unfortunately, these same properties render per- and polyfluoroalkyl substances resistant to degradation in the environment, leading to bioaccumulation when ingested over time. Some recent studies have linked per- and polyfluoroalkyl substances to various detrimental health effects, most notably elevated levels of cholesterol, but also kidney cancer, testicular cancer, thyroid disease, and pregnancy-induced hypertension.

To date, various technologies have been employed to remove per- and polyfluoroalkyl substances from the environment and from drinking water, but none have been entirely satisfactory. For example, some prior art has attempted to remove per- and polyfluoroalkyl substances by contacting the fluids containing per- and polyfluoroalkyl substances with various sorbents. However, the prior art has failed to explain which chemical and microstructural characteristics of a sorbent will—or will not—result in effective uptake of per- and polyfluoroalkyl substances. Thus, there remains a need not only for more effective sorbents in themselves to better remove per- and polyfluoroalkyl substances from the environment and from drinking water, but there is also a need for those materials that are designed to possess the desired chemical and microstructural characteristics.

SUMMARY

The present disclosure provides sorbents for the removal of one or more per- and polyfluoroalkyl substances from fluids. In one aspect, the present disclosure provides a sorbent for removing one or more per- and polyfluoroalkyl substances from a fluid, the sorbent exhibiting a volumetric iodine number of about 450 mg/cm$^3$ to about 550 mg/cm$^3$ and a volumetric molasses number of about 100 cm$^{-3}$ to about 400 cm$^{-3}$.

In one embodiment, the sorbent comprises one or more of carbonaceous char, activated carbon, reactivated carbon, and carbon black.

In another embodiment, the sorbent comprises one or both of activated carbon and reactivated carbon, which, in any embodiment, may be formed from a precursor carbonaceous material selected from one or more of bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, and polymer fibers.

In another embodiment, the activated carbon or reactivated carbon is formed from one or both of bituminous coal and sub-bituminous coal.

In another embodiment, the activated carbon or reactivated carbon is reagglomerated.

In another embodiment, the sorbent has a volumetric iodine number of about 450 mg/cm$^3$ to about 600 mg/cm$^3$ and a volumetric molasses number of about 100 cm$^{-3}$ to about 400 cm$^{-3}$.

In another embodiment, a bed containing the sorbent can remove PFOA from at least about 20,000 bed volumes of water containing a concentration of PFOA of about 61 ng/L or less, thereby producing a filtered water stream, before a concentration of about 15 ng/L PFOA is detected in the filtered water stream.

In another aspect, the present disclosure provides a method of removing one or more perfluoroalkyl and polyfluoroalkyl substances from a fluid, the method comprising: providing a sorbent having a volumetric iodine number of at least about 450 mg/cm$^3$ and a volumetric molasses number of at least about 100 cm$^{-3}$; and contacting the fluid with the sorbent.

In one embodiment, the sorbent comprises one or more of carbonaceous char, activated carbon, reactivated carbon, and carbon black.

In another embodiment, the sorbent comprises one or both of activated carbon or reactivated carbon.

In another embodiment, the activated carbon or reactivated carbon is formed from a precursor carbonaceous material selected from one or more of bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, and polymer fibers.

In another embodiment, the activated carbon or reactivated carbon is formed from one or more of bituminous coal and sub-bituminous coal.

In another embodiment, the activated carbon or reactivated carbon is reagglomerated.

In another embodiment, the sorbent has a volumetric iodine number of about 450 mg/cm$^3$ to about 600 mg/cm$^3$ and a volumetric molasses number of about 100 cm$^{-3}$ to about 400 cm$^{-3}$.

In another embodiment, the sorbent has a volumetric iodine number is about 500 mg/cm$^3$ to about 550 mg/cm$^3$ and the volumetric molasses number of about 110 cm$^{-3}$ to about 350 cm$^{-3}$.

In another embodiment, a bed containing the sorbent can remove PFOA from at least about 20,000 bed volumes of water containing a concentration of PFOA of about 61 ng/L or less, thereby producing a filtered water stream, before a concentration of about 15 ng/L PFOA is detected in the filtered water stream.

In another aspect, the present disclosure provides a sorbent composition comprising one or more sorbents having a volumetric iodine number of at least about 450 mg/cm$^3$ and a volumetric molasses number of at least about 100 cm$^{-3}$ and optionally a second sorbent.

In one embodiment, the sorbent composition comprises one or more inert materials, fillers, binders, or other compositions that do not possess any appreciable sorbent capacity.

In another embodiment, the sorbent has a volumetric iodine number of about 450 mg/cm$^3$ to about 600 mg/cm$^3$ and a volumetric molasses number of about 100 cm$^{-3}$ to about 400 cm$^{-3}$.

In another embodiment, the sorbent has a volumetric iodine number is about 500 mg/cm$^3$ to about 550 mg/cm$^3$ and the volumetric molasses number of about 110 cm$^{-3}$ to about 350 cm$^{-3}$.

In another embodiment, a bed containing the sorbent composition can remove PFOA from at least about 20,000 bed volumes of water containing a concentration of PFOA of about 61 ng/L or less, thereby producing a filtered water stream, before a concentration of about 15 ng/L PFOA is detected in the filtered water stream.

DRAWINGS

Aspects, features, benefits and advantages of the embodiments described herein will be apparent with regard to the following description, appended claims, and accompanying drawings where:

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, the term "about" means plus or minus 10% of the numerical value of the number with which it is modifying. Therefore, about 50% means in the range of 45%-55%. When describing a temperature, the term "about" refers to the named temperature±5 degrees.

As used herein, the term "sorbent composition" means a material or mixture of materials that comprises a sorbent. The sorbent composition can be formed entirely of sorbent media, or the sorbent can alternatively include one or more inert materials, fillers, binders, or other compositions that do not possess any appreciable sorbent capacity.

As used herein, the term "sorbent media" means all known materials from any source capable of adsorbing or absorbing liquids and/or gases. For example, sorbent media may include, as non-limiting examples, one or more of carbonaceous char, activated carbon, reactivated carbon, carbon nanotubes, graphenes, natural and synthetic zeolite, silica, silica gel, alumina, polystyrene sulfonate, alumina, zirconia, and diatomaceous earth.

As used herein, the term "per- and polyfluoroalkyl substances (PFAS)" means any perfluoroalkyl or polyfluoroalkyl substance, mixture of such substances, or derivative of one or more such substances. Examples of per- and polyfluoroalkyl substances include perfluoroalkyl sulfonates, perfluoroalkane sulfonic acids (PFSA), N-butyl perfluoroalkane sulfonamides (BuFASA), N-butyl perfluoroalkane sulfonamido ethanols (BuFASE), N-butyl perfluoroalkane sulfonamido acetic acids (BuFASAA), N-ethyl perfluoroalkane sulfonamides (EtFASA), N-ethyl perfluoroalkane sulfonamido ethanols (EtFASE), N-ethyl perfluoroalkane sulfonamido acetic acids (EtFASAA), perfluoroalkane sulfonamides (FASA), perfluoroalkane sulfonamido ethanols (FASE), perfluoroalkane sulfonamido acetic acids (FASAA), N-methyl perfluoroalkane sulfonamides (MeFASA), N-ethyl perfluoroalkane sulfonamido acetic acids (MeFASAA), N-methyl perfluoroalkane sulfonamido ethanols (MeFASE), perfluoroalkane sulfonyl fluorides (PASF), fluoroproteins (FP), fluorotelomer carboxylic acids (FTCA), fluorotelomer alcohols (FTOH), fluorotelomer sulfonates (FTS), fluorotelomer sulfonic acids (FTSA), perfluoroalkyl acids (PFAA), perfluoroalkylsulfonamidoethanols (PFOSE), and any derivatives thereof. These include, for example and without limitation, ammonium perfluorooctanoate (APFO) 4,8-dioxa-3H-perfluorononanoate, N-methyl perfluorooctane sulfonamide (MeFOSA), perfluorooctanoic acid (PFOA), perfluorooctane sulfonate, perfluorooctanesulfonic acid (PFOS), 2,3,3,3,-tetrafluoro-2-(heptafluoropropoxy) propanoate, ammonium 2,3,3,3-tetrafluoro-2-(heptafluoropropoxy)propanoate, 1,2,2,2-tetrafluoroethyl ether, 4:2-fluorotelomersulfonic acid (4:2 FtS), 6:2-fluorotelomersulfonic acid (6:2 FtS), 8:2-fluorotelomersulfonic acid (8:2 FtS), perfluorobutanoic acid (PFBA), perfluorobutane sulfonate, perfluorobutane sulfonic acid (PFBS), perfluorohexane sulfonate, perfluorohexane sulfonic acid (PFHxS), perfluorohexanoate, perfluorohexanoic acid (PFHxA), 4,8-dioxa-3H-perfluorononanoate, ammonium perfluorooctanoate (APFO), N-ethyl perfluorooctane sulfonamide (EtFOSA), N-ethyl perfluorooctane sulfonamido ethanol (EtFOSE), perfluorooctane sulfonamide (PFOSA), perfluorooctane sulfonamido acetic acid (FOSAA), perfluorooctane sulfonamido ethanol (FOSE), perfluorobutanoate, perfluorobutanoic acid, perfluorobutyrate, perfluorobutyric acid, perfluoroalkyl carboxylate, perfluoroalkyl carboxylic acid (PFCA), perfluorodecanoate, perfluorodecanoic acid (PFDA), perfluorododecanoate, perfluorododecanoic acid (PFDoA), perfluorododecane sulfonate (PFDoS), perfluorododecane sulfonic acid (PFDoSA), perfluorodecane sulfonate, perfluorodecane sulfonic acid (PFDS), perfluoroheptanoate, perfluoroheptanoic acid (PFHpA), perfluoroheptane sulfonate, perfluoroheptane sulfonic acid (PFHpS), perfluorononanoate, perfluorononanoic acid (PFNA), perfluorononane sulfonate, perfluorononane sulfonic acid (PFNS), perfluorooctanoate, perfluorophosphonic acid (PFPA), perfluoropentanoate, perfluoropentanoic acid (PFPeA), perfluoropentane sulfonate, perfluoropentane sulfonic acid (PFPeS), perfluorophosphinic acid (PFPiA), perfluorotetradecanoic acid (PFTeDA), perfluorotridecanoic acid (PFTrDA), perfluoroundecanoate, perfluoroundecanoic acid (PFUnA), perfluoroundecane sulfonate (PFUnS), perfluoroundecane sulfonic acid (PFUnSA), and polytetrafluoroethylene (PTFE).

As used herein, "iodine number" or "IV" refers to either a gravimetric iodine number or a volumetric iodine number. The iodine number is a measure of the equilibrium mass of iodine adsorbed on the surface of a normalized amount of a sorbent. The iodine number is a measure of the surface area and porosity of a sorbent.

As used herein, "gravimetric iodine number" or "$IV_g$" means the property of a sorbent that is formed from carbonaceous material as determined by the industry standard test ASTM D4607-14. gravimetric iodine number is reported in units of mass of iodine adsorbed per mass a sorbent.

As used herein, "volumetric iodine number" or "$IV_v$" means the product of the gravimetric iodine number and the apparent density of a sorbent. The apparent density of the sorbent is obtained by the industry standard test ASTM D2854-09 (2019). The gravimetric iodine number has the meaning described in the preceding paragraph. The volumetric iodine number is reported in units of mass of iodine adsorbed per volume of sorbent.

As used herein, "molasses number" or "MN" refers to either a gravimetric molasses number or a volumetric molasses number. Molasses number is a measure of the decolorization capacity of a sorbent and is an indicator of the macro pore and transport pore structure of the sorbent.

As used herein, "gravimetric molasses number" or "$MN_g$" means the determination of the decolorizing capacity of a sorbent in accordance with Calgon Carbon Method Number TM-3 entitled "Determination of the Molasses Number of Activated Carbon." The full test procedure is described fully herein. The gravimetric molasses number is reported as a unitless quantity measured per mass of sorbent.

As used herein, "volumetric molasses number" "$MN_v$" means the product of the gravimetric molasses number and the apparent density of a sorbent. The gravimetric molasses number has the meaning described in the preceding paragraph. The apparent density of a sorbent is obtained by the industry standard test ASTM D2854-09 (2019). The volumetric molasses number is reported as a unitless quantity measured per volume of sorbent.

Sorbents and Sorbent Compositions

The disclosure provides a sorbent composition comprising at least one sorbent effective in removing one or more per- and polyfluoroalkyl substances, as described above, from a fluid. The at least one sorbent exhibits a volumetric iodine number of at least about 450 mg/cm$^3$ (e.g. about 450 mg/cm$^3$ to about 600 mg/cm$^3$) and a volumetric molasses number of at least about 100 cm$^{-3}$ (e.g., about 100 cm$^{-3}$ to about 400 cm$^{-3}$).

Advantageously, a sorbent having a volumetric iodine number of at least about 450 mg/cm$^3$ and a volumetric molasses number of at least about 100 cm$^{-3}$ may exhibit an excellent capacity for the adsorption of one or more per- and polyfluoroalkyl substances. In one embodiment, the one or more sorbents exhibit a volumetric iodine number of at least about 460 mg/cm$^3$ and a volumetric molasses number of at least about 100 cm$^{-3}$. In one embodiment, the one or more sorbents exhibit a volumetric iodine number of at least about 470 mg/cm$^3$ and a volumetric molasses number of at least about 100 cm$^{-3}$. In one embodiment, the one or more sorbents exhibit a volumetric iodine number of at least about 480 mg/cm$^3$ and a volumetric molasses number of at least about 100 cm$^{-3}$. In one embodiment, the one or more sorbents exhibit a volumetric iodine number of at least about 490 mg/cm$^3$ and a volumetric molasses number of at least about 100 cm$^{-3}$. In one embodiment, the one or more sorbents exhibit a volumetric iodine number of at least about 500 mg/cm$^3$ and a volumetric molasses number of at least about 100 cm$^{-3}$. In one embodiment, the one or more sorbents exhibit a volumetric iodine number of at least about 510 mg/cm$^3$ and a volumetric molasses number of at least about 100 cm$^{-3}$. In one embodiment, the one or more sorbents exhibit a volumetric iodine number of at least about 520 mg/cm$^3$ and a volumetric molasses number of at least about 100 cm$^{-3}$. In one embodiment, the one or more sorbents exhibit a volumetric iodine number of at least about 530 mg/cm$^3$ and a volumetric molasses number of at least about 100 cm$^{-3}$. In one embodiment, the one or more sorbents exhibit a volumetric iodine number of at least about 540 mg/cm$^3$ and a volumetric molasses number of at least about 100 cm$^{-3}$. In one embodiment, the one or more sorbents exhibit a volumetric iodine number of at least about 550 mg/cm$^3$ and a volumetric molasses number of at least about 100 cm$^{-3}$. In one embodiment, the one or more sorbents exhibit a volumetric iodine number of at least about 560 mg/cm$^3$ and a volumetric molasses number of at least about 100 cm$^{-3}$. In one embodiment, the one or more sorbents exhibit a volumetric iodine number of at least about 570 mg/cm$^3$ and a volumetric molasses number of at least about 100 cm$^{-3}$. In one embodiment, the one or more sorbents exhibit a volumetric iodine number of at least about 580 mg/cm$^3$ and a volumetric molasses number of at least about 100 cm$^{-3}$. In any embodiment, the one or more sorbents exhibit a volumetric iodine number of at least about 590 mg/cm$^3$ and a volumetric molasses number of at least about 100 cm$^{-3}$. In any embodiment, the one or more sorbents exhibit a volumetric iodine number of at least about 600 mg/cm$^3$ and a volumetric molasses number of at least about 100 cm$^{-3}$. In any embodiment, the one or more sorbents exhibit a volumetric iodine number of about 450 mg/cm$^3$ to about 500 mg/cm$^3$, about 470 mg/cm$^3$ to about 550 mg/cm$^3$, about 500 mg/cm$^3$ to about 550 mg/cm$^3$, about 520 mg/cm$^3$ to about 550 mg/cm$^3$, or about 490 mg/cm$^3$ to about 520 mg/cm$^3$. The preceding values and ranges can be used alone or in combination, and any range may be formed by selecting two or more of the above endpoints.

In any embodiment, including those that overlap with the embodiments in the preceding paragraph, the one or more sorbents exhibit a volumetric molasses number of about 100 cm$^{-3}$, about 110 cm$^3$, about 120 cm$^{-3}$, about 130 cm$^{-3}$, about 140 cm$^{-3}$, about 150 cm$^{-3}$, about 160 cm$^{-3}$, about 170 cm$^{-3}$, about 180 cm$^{-3}$, about 190 cm$^{-3}$, about 200 cm$^{-3}$, about 210 cm$^{-3}$, about 220 cm$^{-3}$, about 230 cm$^{-3}$, about 240 cm$^{-3}$, about 250 cm$^{-3}$, about 260 cm$^{-3}$, about 270 cm$^{-3}$, about 280 cm$^3$, about 290 cm$^{-3}$, about 300 cm$^{-3}$, about 310 cm$^{-3}$, about 320 cm$^{-3}$, about 330 cm$^{-3}$, about 340 cm$^{-3}$, about 350 cm$^{-3}$, about 360 cm$^{-3}$, about 370 cm$^{-3}$, about 380 cm$^{-3}$, about 390 cm$^{-3}$, about 400 cm$^{-3}$ or any range that is formed by selecting two or more of the above values as endpoints.

The apparent density of a sorbent, as disclosed herein, is not limited and may, in any embodiment, be less than about 1.00 g/cm$^3$, less than about 0.95 g/cm$^3$, less than about 0.90 g/cm$^3$, less than about 0.85 g/cm$^3$, less than about 0.80 g/cm$^3$, less than about 0.75 g/cm$^3$, less than about 0.70 g/cm$^3$, less than about 0.65 g/cm$^3$, less than about 0.60 g/cm$^3$, less than about 0.55 g/cm$^3$, less than about 0.50 g/cm$^3$, less than about 0.45 g/cm$^3$, less than about 0.40 g/cm$^3$, or less than about 0.35 g/cm$^3$. In any embodiment, the apparent density of the sorbent may be about 1.00 g/cm$^3$, about 0.95 g/cm$^3$, about 0.90 g/cm$^3$, about 0.85 g/cm$^3$, about 0.80 g/cm$^3$, about 0.75 g/cm$^3$, about 0.70 g/cm$^3$, about 0.65 g/cm$^3$, about 0.60 g/cm$^3$, about 0.55 g/cm$^3$, about 0.50 g/cm$^3$, about 0.45 g/cm$^3$, about 0.40 g/cm$^3$, about 0.35 g/cm$^3$, about 0.30 g/cm$^3$, or any range that is formed from any two of those values as endpoints. In any embodiment, the apparent density of a sorbent may be about 0.30 g/cm$^3$ to about 1.00 g/cm$^3$, about 0.30 g/cm$^3$ to about 0.95 g/cm$^3$, about 0.30 g/cm$^3$ to about 0.90 g/cm$^3$, about 0.30 g/cm$^3$ to about 0.85 g/cm$^3$, about 0.30 g/cm$^3$ to about 0.80 g/cm$^3$, about 0.30 g/cm$^3$ to about 0.75 g/cm$^3$, about 0.30 g/cm$^3$ to about 0.70 g/cm$^3$, about 0.30 g/cm$^3$ to about 0.65 g/cm$^3$, about 0.30 g/cm$^3$ to about 0.60 g/cm$^3$, about 0.30 g/cm$^3$ to about 0.55 g/cm$^3$, about 0.30 g/cm$^3$ to about 0.50 g/cm$^3$, about 0.30 g/cm$^3$ to about 0.45 g/cm$^3$, about 0.30 g/cm$^3$ to about 0.40 g/cm$^3$, or about 0.30 g/cm$^3$ to about 0.35 g/cm$^3$.

A sorbent composition may comprise one or more sorbents, each sorbent comprising or derived from a sorbent media selected from (but not limited to) one or more of carbonaceous char, activated carbon, carbon nanotube, graphene, reactivated carbon, carbon black, natural and synthetic zeolite, silica, silica gel, alumina, alumina clay, zirconia, diatomaceous earth, and metal oxides. A sorbent composition comprising one or more sorbents may comprise or be derived from, in any embodiment, a single type of sorbent media or may be combined with a sorbent comprising or derived from one or more additional types of sorbent or non-sorbent media. In embodiments where a sorbent composition comprises two or more types of sorbents, the two or more sorbents may be mixed together and may comprise or be derived from the same or different precursor materials selected from those described above.

In any embodiment, the one or more sorbents may comprise one or both of activated carbon and reactivated carbon. In such embodiments, the activated and/or reactivated carbon may be prepared from any precursor carbonaceous material known in the art including, but not limited to, bituminous coal, sub-bituminous coal, lignite coal, anthracite coal, wood, wood chips, coconut including coconut shell, sawdust, peat, nut shells, pits, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, polymer fibers, any other carbonaceous material, or any combination thereof. In any embodiment, reactivated carbon may be derived from activated carbon of any origin that has been exhausted or substantially exhausted from use.

Activated carbon and reactivated carbon suitable for use in the sorbent and sorbent compositions disclosed herein may be of any grade or type, selected based on performance requirements, cost, and/or other considerations. Activated carbon or reactivated carbon may be employed in one or more of powdered form, which is referred to as "powdered activated carbon" or "PAC", granular form, which is referred to as "granular activated carbon" or "GAC", or pellet form, which is referred to as pelletized activated carbon. In any embodiment, a sorbent may comprise activated or reactivated carbon in one of PAC, GAC, or pelletized form, or may comprise a mixture of two or more forms. Powdered activated carbon (PAC), as used herein to defined as particles that pass through an 80-mesh sieve (holes of about 0.180 mm). Granular activated carbon (GAC), as used herein, is defined as activated carbon particles sized to be retained on a 50-mesh sieve (holes of about 0.300 mm). While these particle size ranges are mentioned for activated carbon sorbents, it is also contemplated that any of the disclosed sorbents may be measured by the above 50-mesh and 80-mesh sieve sizes.

In any embodiment, a sorbent composition may comprise one or more components additional to the sorbent having a volumetric iodine number of at least about 450 mg/cm$^3$ and a volumetric molasses number of at least about 100 cm$^{-3}$, such as an additional sorbent for removing one or more one or more per- and polyfluoroalkyl substances, a sorbent for removing a non-PFAS compound, or a non-sorbent. For example, in any embodiment, a sorbent composition may comprise at least two different sorbent types, each effective to absorb or adsorb one or more per- and polyfluoroalkyl substances. In any embodiment, a sorbent composition as described herein may further include at least one compound that is not a sorbent and which cannot substantially absorb or adsorb per- and polyfluoroalkyl substances or any other compound.

For example, in any embodiment, a sorbent composition may be formed comprising sorbent having a volumetric iodine number of at least about 450 mg/cm$^3$ and a volumetric molasses number of at least about 100 cm$^{-3}$ and a non-sorbent which is a binder. Such a composition may be molded, extruded, or otherwise formed into one or more shapes, such as pellets. The type of binder is not particularly limited and may include any organic or inorganic binder known in the art. As examples of inorganic binder, metals, ceramics, clays, glasses, or combinations of one or more of the above are commonly used. As examples of organic binders, petroleum resins and/or pitches, natural resins and/or pitches, polymers, or combinations of one or more of the above are used.

In any embodiment, a sorbent composition comprising one or more sorbents having a volumetric iodine number of at least about 450 mg/cm$^3$ and a volumetric molasses number of at least about 100 cm$^{-3}$, as described herein, may be provided within a container. A container may hold a sorbent composition comprising the one or more sorbents having a volumetric iodine number of at least about 450 mg/cm$^3$ and a volumetric molasses number of at least about 100 cm$^{-3}$ is configured and sized to receive a fluid (i.e., liquid or gas) and convey said fluid over or through the container, thus bringing fluid in contact with the sorbent composition and one or more sorbents thereof. The type of container is not particularly limited. For example, in any embodiment, the container may be a permanent container that is installed within a device or process facility and which is connected by piping or other fluid conduits so that the liquid or gas flows through the container. From time to time, spent sorbent may be emptied from the container and replaced by one or both of virgin sorbents or reactivated sorbents in order to ensure that the sorbents remain effective in removing per- and polyfluoroalkyl substances or chemically similar or chemically related compounds from liquid or gas that flows through the container. The physical form of the sorbent composition comprising one or more sorbents that is provided within the container is not limited and may be provided loose (alone) or formed as a cartridge with other structural materials that hold it in place.

In another example, and in any embodiment, a container itself is may be designed to be replaced rapidly and with minimal change to outside components such as pumps and conduits that convey the liquids or gases to the container. In such embodiments, the container may be referred to as a "cartridge," and it can be connected and disconnected from surrounding components. In any embodiment, a cartridge may be disposable, such as in consumer drinking water applications. Alternatively, in another example and in any embodiment, a cartridge may be intended to be refurbished, with the cartridge containing spent sorbent returned for cleaning or reactivation of the sorbent, refilled with fresh virgin or reactivated sorbent, and returned to service following completion of the refurbishing operation.

Methods of Making

A sorbent composition comprises one or more sorbents effective in removing one or more per- and polyfluoroalkyl substances and exhibiting a volumetric iodine number of at least about 450 mg/cm$^3$ (e.g. about 450 mg/cm$^3$ to about 600 mg/cm$^3$) and a volumetric molasses number of at least about 100 cm$^{-3}$ (e.g., about 100 cm$^{-3}$ to about 400 cm$^{-3}$).

The one or more sorbents having a volumetric iodine number of at least about 450 mg/cm$^3$ and a volumetric molasses number of at least about 100 cm$^{-3}$ may be formed from one or more precursor material selected from, but not limited to, carbonaceous char, activated carbon, carbon nanotube, graphene, reactivated carbon, carbon black, natural and synthetic zeolite, silica, silica gel, alumina, alumina clay, zirconia, diatomaceous earth, and metal oxides. When the sorbent comprises activated carbon or reactivated carbon. The activated carbon and reactivated carbon may be of any grade or type, such as PAC, GAC, pelletized activated carbon, any reactivated form thereof, or any combination thereof.

Granular activated or reactivated carbon may be formed by pulverizing a precursor carbonaceous material to a powder of a desired size. The powder may optionally be mixed with a binder. The pulverized material, optionally with a binder, may then be formed into briquettes which may then be subsequently ground into granules of a desired size. The resultant granular material may then be carbonized to alter its properties, such as, but not limited to, removing volatile compounds and activating the precursor carbonaceous material.

Pelletized activated carbon may be formed by pulverizing a precursor carbonaceous material, combining the pulverized material with a binder, and extruding the mixture into pellets. The pellets may then be carbonized to alter its properties, such as, but not limited to, removing volatile compounds and activating the precursor carbonaceous material.

A sorbent made from activated carbon and/or reactivated carbon may be formed by any process known in the art, provided the end sorbent product exhibits, as recited above, a volumetric iodine number of at least about 450 mg/cm$^3$ (e.g. about 450 mg/cm$^3$ to about 600 mg/cm$^3$) and a volumetric molasses number of at least about 100 cm$^{-3}$ (e.g., about 100 cm$^{-3}$ to about 400 cm$^{-3}$).

For example, activated carbon may be formed by oxidizing and devolatizing a virgin carbonaceous material with steam and/or carbon dioxide gasified to form the desired pore structure in the activated carbon thereby providing the desired material properties (e.g., gravimetric iodine number, gravimetric molasses number). Initial oxidation and devolatilization processes may, in any embodiment, include a chemical treatment with a dehydrating chemical, such as phosphoric acid, sulfuric acid, sodium hydroxide, potassium hydroxide, or any combination thereof.

In another example, suitable activated carbon may be formed by a direct activation process. Such activated carbon sorbent is sometimes referred to as a direct activated carbon. In the direct activation process, the precursor carbonaceous material which is usually coal is crushed and sized. The crushed and sized precursor carbonaceous material is then carbonized and thermally activated.

In any embodiment, a suitable sorbent may comprise a reactivated sorbent that has previously had its sorbent capacity exhausted or substantially exhausted and that has been reactivated to restore at least some of the original sorbent capacity. Any of the above listed sorbents can be reactivated following exhaustion, and the reactivation can be performed by heat, pressure, chemical exposure, or any combination thereof. In any embodiment, a reactivated sorbent may comprise reactivated carbon. Reactivated carbon may be manufactured by heating spent, exhausted activated carbon in a low oxygen atmosphere using steam as a selective oxidant. During reactivation, absorbed and adsorbed organic compounds may be either volatilized from the activated carbon or pyrolyzed to form carbon char. Heating may take place at a temperature above about 500° C. (e.g., about 500° C. to about 1100° C.), more particularly above about 700° C. (e.g. about 700° C. to about 1100° C.), and the resulting reactivated carbon may thereafter be reused for various purposes including water treatment.

While any process may be utilized to yield a sorbent with a volumetric iodine number of at least about 450 mg/cm$^3$ (e.g. about 450 mg/cm$^3$ to about 600 mg/cm$^3$) and a volumetric molasses number of at least about 100 cm$^{-3}$ (e.g., about 100 cm$^{-3}$ to about 400 cm$^{-3}$), the following observations may provide useful guidelines to one of skill in the art, as the volumetric iodine number and the volumetric molasses number of a particular sorbent are influenced by many factors, including the choice of the one or more of the precursor carbonaceous material/s and processing steps that are performed on the precursor carbonaceous material/s. For example, in general, continued steam activation of precursor carbonaceous material generally increases gravimetric iodine number and gravimetric molasses number but simultaneously decreases the apparent density of a carbonaceous materials. For many precursor carbonaceous materials, there is a maximum gravimetric molasses number that can be achieved before further activation causes the gravimetric molasses number to decline. Thus, simply increasing the gravimetric iodine number and gravimetric molasses number might not, beyond a certain point, results in an increased volumetric iodine number and volumetric molasses number. Taking all of the above together, the disclosure describes sorbents that maximize both of the volumetric iodine number and the volumetric molasses number to achieve excellent performance.

Although the sorbents of the disclosure are primarily disclosed as removing per- and polyfluoroalkyl substances, or chemically similar or chemically related compounds, the use of the sorbents is not so limited. In still further embodiments, the sorbents are suitable for removing any compounds and/or byproducts that cause taste and odor problems in water. Such compounds are referred to as "taste and odor compounds" throughout the application. Examples of such taste and odor compounds include one or more of trans-1, 10-dimethyl-trans-9-decalol ("Geosmin"), 2-methylisoborneol (MIB), isopropylmethoxypyrazine (IPMP), isobutylmethoxypyrazine (IBMP), methyl tertiary butyl ether (MTBE), 2,4-heptadienal, decandienal, octanal, chlorine, chloramine, chlorophenols, iodoform, hydrocarbons, and volatile organic compounds (VOCs).

As described herein, surface and pore morphology of a sorbent is described by the combination of the volumetric iodine number and volumetric molasses number. While not wishing to be bound by theory, the combination of the volumetric iodine number and the volumetric molasses number together describe both the overall adsorptive capacity of the sorbent and the kinds of molecules that the sorbent is effective at adsorbing. Following intensive experiments, Applicants determined that a sorbent that has only one of a volumetric iodine number of at least about 450 mg/cm$^3$ (e.g. about 450 mg/cm$^3$ to about 600 mg/cm$^3$) and a volumetric molasses number of at least about 100 cm$^{-3}$ (e.g., about 100 cm$^{-3}$ to about 400 cm$^{-3}$) cannot fulfill the requirements of excellent adsorbent/absorbent capacity of a wide range of per- and polyfluoroalkyl substances. Along the same lines, a material that has a very high measured value for one of a gravimetric iodine number and gravimetric molasses number cannot compensate for a lowered measured value in other. Applicants also determined that it is the volumetric measurements and not the gravimetric measurements that best describe the performance of the sorbent with respect to per- and polyfluoroalkyl substances, and as such, the apparent density is likewise important in providing effective sorbent compositions and sorbents for the removal of per- and polyfluoroalkyl substances from a fluid.

Methods of Using

Advantageously, a sorbent formed by processes described herein, having a volumetric iodine number of at least about 450 mg/cm$^3$ (e.g. about 450 mg/cm$^3$ to about 600 mg/cm$^3$) and a volumetric molasses number of at least about 100 cm$^{-3}$ (e.g., about 100 cm$^{-3}$ to about 400 cm$^{-3}$) lends itself excellent performance in removing one or more per- and polyfluoroalkyl substances from a fluid, such as water (e.g., drinking water).

As such, provided herein is a method of removing one or more per- and polyfluoroalkyl substances from a fluid, the method comprising contacting a sorbent composition comprising one or more sorbents, as disclosed herein, with a fluid containing one or more per- and polyfluoroalkyl substances compounds. As described above, at least one of the one or more sorbents exhibit a volumetric iodine number of at least about 450 mg/cm$^3$ (e.g. about 450 mg/cm$^3$ to about 600 mg/cm$^3$) and a volumetric molasses number of at least about 100 cm$^{-3}$ (e.g., about 100 cm$^{-3}$ to about 400 cm$^{-3}$).

The method of contacting is not particularly limited. For example, in any embodiment, a stream comprising a fluid may be passed through or over a bed comprising a sorbent composition comprising one or more sorbents. In another example, a sorbent composition comprising one or more sorbents may be injected into or otherwise combined with the fluid. Optionally, a sorbent composition comprising the one or more sorbents may be collected from the fluid after adsorbing a desired quantity of one or more per- and polyfluoroalkyl substances from the fluid, for example, through filtering the fluid to isolate the sorbent composition. The makeup of the fluid is not limited and may include, in any embodiment, one or more of liquid water, water vapor, air, and soil.

EXAMPLES

Before the Examples are described, the test methods must be fully described.

Determination of Iodine Number (IV)

Gravimetric iodine number of the activated carbon samples was measured in accordance with ASTM D4607-14. Gravimetric iodine number is reported in units of milligrams of iodine adsorbed per gram of activated carbon sample.

To compute the volumetric iodine number, the apparent density ($\rho_b$) of the activated carbon samples was measured according to the industry standard test ASTM D2854-09 (2019). After the gravimetric iodine number and the apparent density were obtained, the volumetric iodine number was determined by multiplying the gravimetric iodine number by the apparent density. Volumetric iodine number is thus reported in units of milligrams per cubic centimeter.

Determination of Gravimetric Molasses Number ($MN_g$)

To determine the gravimetric molasses number, the Calgon Carbon Corporation Test Method Number TM-3 ("TM-3") was utilized. TM-3 is intended to determine the decolorizing capacity of activated carbon. The decolorizing capacity of activated carbon describes the pore structure and material transport of the activated carbon. The determination of the gravimetric molasses number in accordance with TM-3. The volumetric molasses number ($MN_v$) was computed by multiplying the molasses number of TM-3 with the apparent density obtained by ASTM D2854-09 (2019). The gravimetric molasses number was determined by TM-3 as follows:

Limitations: The concentration of the molasses solution used for the test is dependent upon a Standard Carbon. As used herein, a "Standard Carbon" is an activated carbon sorbent that is a reference material for the property of the gravimetric molasses number. As is appreciated by skilled practitioners in the art, a "200 Standard Carbon" can be expected to result in a gravimetric molasses number of 200, a "250 Standard Carbon" can be expected to have a gravimetric molasses number of 250, and so forth. A 200 Standard Carbon must be used for activated carbon products predicted to have less than a 230 gravimetric molasses number. A 250 Standard Carbon must be used for activated carbon products predicted to have less than 350 gravimetric molasses number. A 400 Standard Carbon must be used for activated carbon products predicted to have a 350 or greater gravimetric molasses number. Whenever a product has a molasses specification range that includes a Molasses Standard Carbon limit, the higher Molasses Standard Carbon should be used. In these cases, it is appropriate to include the Molasses Standard Carbon to be utilized on the Product Specification as a note to manufacturing. The molasses solutions cannot be diluted. A fixed path length of 2.5 mm must be used.

As is appreciated by those of skill in the art, the Standard Carbon is not limited so long as it is a suitable reference material for the molasses number. One example of a 400 Standard Carbon is "RB," which is available from Calgon Carbon Corporation of Moon Township, PA. RB is a powdered, steam-activated carbon made from bituminous coal that has a minimum gravimetric iodine number of 1070 mg/g, a gravimetric molasses number of 400, a maximum ash content of 23 wt. %, a maximum moisture content of 2 wt. %, and 60-75 wt. % of particles screened at 325 mesh or having sizes of less than 44 µm. A second example of a 320 Standard Carbon is "RC," which is available from Calgon Carbon Corporation of Moon Township, PA. RC is a powdered, steam-activated carbon made from bituminous coal that has a minimum gravimetric iodine number of 1020 mg/g, a gravimetric molasses number of 320, a maximum ash content of 23 wt. %, a maximum moisture content of 2 wt. %, and 60-75 wt. % of particles screened at 325 mesh or having sizes of less than 44 μm. A third example of a 230 Standard Carbon is "BL," which is available from Calgon Carbon Corporation of Moon Township, PA. BL is a powdered, steam-activated carbon made from bituminous coal that has a minimum gravimetric iodine number of 1000 mg/g, a gravimetric molasses number of 230, a maximum ash content of 10 wt. %, a maximum moisture content of 2 wt. %, and 60-75 wt. % of particles screened at 325 mesh or having sizes of less than 44 μm.

Figure 1:
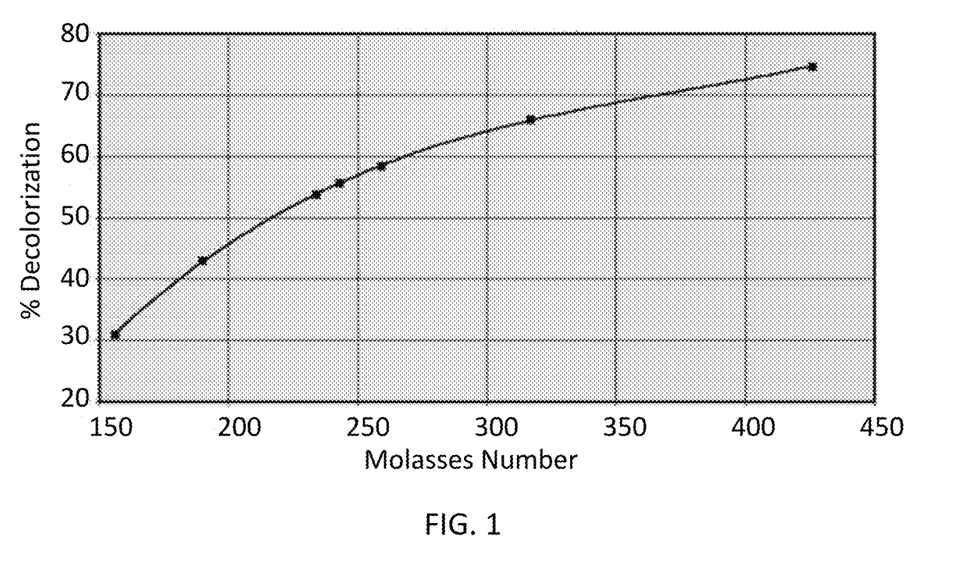
FIG. 1 provides one example of a decolorization curve of a sample of a sorbent, as disclosed herein.
Figure 2:
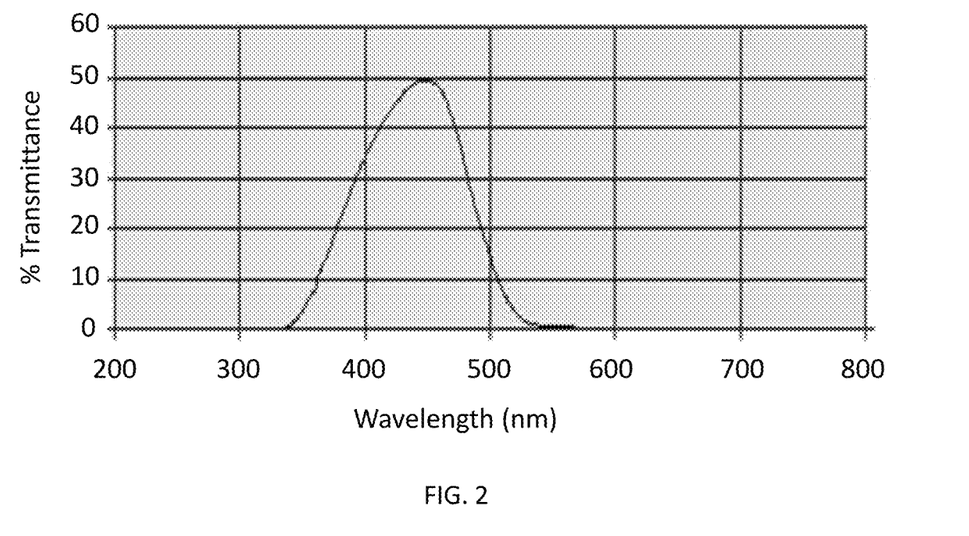
FIG. 2 depicts a UV-Vis transmittance spectrum collected from a sample of a filtrate of a molasses solution after treatment with activated carbon.

Principle of Method: A solution of blackstrap molasses is treated with standard carbon having a known molasses number ("Molasses Standard Carbon"), filtered, and the filtrate analyzed by UV-vis spectrophotometry to generate a relationship between molasses number and absorbance. The solution of blackstrap molasses is then treated with a samples of carbon of unknown decolorizing capacity/unknown molasses number (e.g., a sorbent as provided herein), filtered, and the filtrate analyzed in the same manner. The higher the capacity of a sorbent to decolorize the molasses composition (i.e., decolorization), the lighter the filtrate will be and conversely, the lower the absorbance. A higher molasses number therefore corresponds to a higher capacity for decolorization, as shown in FIG. 1. The absorbance of each filtrate is determined on a standard spectrophotometer at a wavelength of 472 nm with a path length of 2.5 mm (FIG. 2 depicts the transmittance spectrum of a representative filtrate). The molasses number of each sample is calculated from the ratio of the absorbance values of the sample and the standard carbon:

$$\text{Molasses Number} = (A \times B)/C$$

wherein A is the molasses number of the standard carbon with known molasses number; B is the average absorbance of three measurements for the standard carbon with known molasses number; and C is the absorbance of the filtrate of the sorbent being analyzed (i.e., with unknown molasses number).

Safety Precautions: Careful handling and good laboratory techniques should always be used when working with laboratory equipment. The personnel conducting this test should be aware of the potential safety hazards associated with the equipment used in this procedure.

The instruments that were used in TM-3 are set forth in TABLE 1 below:

TABLE 1

| Device or Instrument | Description or Comments: |
|---|---|
| Drying Oven | Electrically heated forced convection drying oven capable of maintaining a constant temperature of 150 ± 5° C. |
| Hotplate/Stirrer | Capable of boiling 50 mL of deionized/distilled water in 3.5 minutes or less; Thermolyne Cimerac 3, Corning Model PC-320 or similar surface temperature of the hotplate should be maintained at 350 ± 20° F. (177 ± 11° C.). |
| Spectrophotometer | Spectronic ® genesys ™ Spectrophotometer equipped with a filter holder to accommodate the 2.5 mm fixed path cell. Instrument is used at a wavelength of 472 nm. Equivalent Spectrophotometers can be used as long as the 2.5 mm fixed path length cell is used. |
| Klett ™ Summerson Cell | 2.5 mm fixed path length, optical glass; available from Hellma, 118-21 Queens Blvd, Forest Hills, NY 11375, 718-544-9534; Part No. 700.011. |
| Beaker | Griffin type, Kimax or Pyrex brand 400 mL. Inspect all beakers to insure the bottom of the glass is flat. Concave or Convex shaped bottoms will give erratic results. |
| Cylinders | Graduated, class A, calibrated to deliver, 50 mL and 1000 mL |
| Pipette | 50 mL Volumetric, class A |
| Buchner Funnels | Size D, 71 mm inner diameter |
| Flasks | Filtering flasks with sidearm, 250 mL |
| Filter Paper | Whatman ® No. 3, 7 cm or similar |
| Vacuum Pump | Any unit capable of pulling a vacuum of 27 inches (685.8 mm) of mercury column at 0° C. |
| Balance | Capable of weighing to the nearest 0.1 mg. |
| Digital Thermocouple or Thermometer | Capable of measuring to the nearest tenth of a degree between 10° C. and 120° C., updating the reading at least every second. |
| Stopwatch | |

The reagents that were used in TM-3 are set forth in TABLE 2 below:

TABLE 2

| Reagent | Description or Comments: |
|---|---|
| ASTM Type II water. | Conductance (micro ohms) < 1.0 Resistance (mega ohms) > 1.0 As used in the context of TM-3, the term "water" means ASTM Type II water. |
| Filter Paper Suspension | Add 16 circles (torn into quarters) of WHATMAN ® No. 3 filter paper and one liter of water to a blender. Mix on high for 30 seconds. Transfer to a suitable container. |

TABLE 2-continued

| Reagent | Description or Comments: |
|---|---|
| Spectral Standard | Spectro-Chek set available from VWR Scientific, Catalog No. 58019-106. The set consists of four solutions, only two of which will be used to check the instrument in the visible range. Follow the instructions in "Procedure for Monitoring Visible Range, Section A-Variable Wavelength Instruments." |
| Molasses Standard Carbon | A 200, 250 and 400 Standard Carbon is available from the Calgon Carbon Corporation Manufacturing Quality Assurance Organization. The 200 Standard Carbon is to be used for all activated carbon products having a predicted molasses number less than 230. The 250 Standard Carbon is to be used for all activated carbon products having a predicted molasses number greater than 230 and less than 350. The 400 Standard Carbon is to be used for all activated carbon products having a predicted molasses number greater than 350 molasses number. |
| Internal Carbon Standard | It is recommended to run an internal carbon standard. Obtain a sufficient quantity of carbon having a molasses number between 200 to 300 and pulverize to 95%, −325 mesh. Oven dry the carbon and determine ten (10) replicate molasses number analyses of the carbon. Using the data obtained from the ten replicates, establish an SPC (statistical process control) chart. Use standard SPC guidelines to calculate upper and lower control limits for the carbon. Once the limits are established, analyze the Internal Carbon Standard before analyzing samples. If the result is found to be in-control, proceed with sample analysis. If the result is out-of-control, steps must be taken to determine the cause for the out-of-control result. Once a result is obtained for the Internal Standard Carbon that is in-control, proceed with sample analysis. Continue to plot results and follow standard SPC guidelines for determining out-of-control trends for the Internal Carbon Standard. |
| Blackstrap Molasses | Plantation Brand Blackstrap Molasses (Allied No. 444) purchased from: Allied Old English, Inc. 100 Markley Street Port Reading, NJ 07064 Note: Molasses from other sources will not yield equivalent results and is an important factor in control of test repeatability and reproducibility. |
| Molasses Solution | Dilute a sufficient quantity (approximately 50 grams/liter) of blackstrap molasses with one liter of deionized/distilled water (per ASTM Type II) total volume to produce a filtrate with an absorbance of 0.630 to 0.650 when treated with Molasses 200 Standard Carbon or Molasses 250 Standard Carbon and an absorbance of 0.390 to 0.410 when treated with Molasses 400 Standard Carbon. See Table 3 for Preparation and Standardization of the Molasses Solution for both Standard Carbon. |

The blackstrap molasses solution ("Standardized Molasses Solution") for determining molasses number were prepared in accordance with the following procedure:

1. About 50 grams of blackstrap molasses was weighed into a clean, dry beaker and set aside until water was heated to 95° C.
2. Using a graduated cylinder, 1000 mL of ASTM Type 2 water was added to a stainless steel beaker.
3. The beaker was covered with aluminum foil or a large glass cover, placed on a hotplate, and heated to 95° C.
4. When the water reached 95° C., the weighed molasses was transferred to the stainless steel beaker and stirred to mix well. The stainless steel beaker was removed from the hotplate.
5. The solution was cooled to room temperature (about 25° C.).
6. The molasses solution from the stainless steel beaker was siphoned into a suitable container. A piece of TYGON tubing was placed in the beaker so the end of the tubing was one inch off of the bottom of the beaker. A pipette bulb was used to begin the siphon. The solution was syphon into a separate container (e.g., a large glass bottle).
7. The remaining beaker content was discarded. The molasses solution was stored in the refrigerator for up to 24 hours. The molasses solution was kept on ice while running the test method.
8. 0.46±0.0002 grams of the 250 Molasses Standard Carbon was weighed into a clean, dry, 400 mL beaker.
9. 50 mL of the Molasses Solution was pipetted into the beaker. The beaker was swirled while adding the Molasses Solution until the 250 Molasses Standard Carbon was thoroughly wetted.
10. The beaker was placed on the hotplate and the thermocouple/thermometer was placed in the beaker so the tip rests on the bottom of the beaker. The solution was heated until the thermocouple/thermometer reaches 98° C. and a stopwatch was started. The thermocouple or thermometer was removed and the solution was allowed to boil for 30 seconds.
11. The sample was filtered by vacuum through a Buchner funnel using a WHATMAN® No. 3 filter paper which was previously prepared. The filter was covered with about 20 mL of the solution and this filtrate was discarded. The remaining portion was filtered.
12. The absorbance of the filtrate at a wavelength of 472 nm was measured and recorded using instrument parameters specified above. The filtrate was considered standardized when the absorbance was between 0.630 and 0.650 ("Standardized 250 Filtrate").
13. The filtrate was considered too dark when the absorbance measured greater than 0.650. In such instances, water may be added to the Molasses Solution. To determine the amount of water required, the volume of molasses solution remaining was measured, multiplied by 0.640, and further by the absorbance recorded from step 12. This number was subtracted from the total volume of molasses solution with the result being the required volume of water to be added to the Molasses Solution. The water was added and the solution was mixed well. Steps 8-13 were repeated until three successive analyzed samples had absorbance values (at 472 nm) between 0.630 and 0.650.
14. The filtrate was considered too light when the absorbance measured less than 0.630. In such instances, more molasses may be added to the Molasses Solution. To determine the amount of molasses to be added, the volume of molasses solution was measured, multiplied by 0.640, and further by the absorbance recorded from step 12. This value was subtracted from the total volume of Molasses Solution, divided by 10, the result representing the amount (weight) of molasses that should be added to the Molasses Solution. The required amount of molasses was added into a small glass beaker. About 25 mL of the Molasses Solution was added to the beaker to dissolve the molasses. The beaker was heated on a hotplate to 90° C. and afterward cooled slightly. The contents were added to the Molasses Solution and mixed well. Steps 8-14 were repeated until three successive samples with absorbance values (at 472 nm) between 0.630 and 0.650 were obtained.

400 Standard Carbon Standardization 15. 0.46±0.0002 grams of the 400 Molasses Standard Carbon was weighed into a clean, dry 400 ml beaker.

16. 50 mL of the Molasses Solution was pipetted into the beaker. The beaker was swirled while adding the Molasses Solution until the carbon was thoroughly wetted.

17. The beaker was placed on the hotplate and the thermocouple/thermometer was placed in the beaker so the tip rests on the bottom of the beaker. The solution was heated until the thermocouple/thermometer reached 98° C. and a stopwatch was started. The thermocouple or thermometer was removed and the solution was allowed to boil for 30 seconds.

18. The sample was filtered by vacuum through a Buchner funnel using WHATMAN® No. 3 filter paper which was previously prepared. The filter was covered with about 20 mL of the solution and this filtrate was discarded. The remaining 30 mL portion was filtered and the filtrate used for subsequent measurements.

19. The absorbance of the filtrate at a wavelength of 472 nm was measured and recorded, using a 2.5 mm fixed path cell. The filtrate was considered standardized when the absorbance measured between 0.390 and 0.410.

20. The filtrate was considered too dark when the absorbance measured greater than 0.410. In such instances, water may be added to the Molasses Solution. To determine the amount of water required, the volume of molasses solution remaining was measured, multiplied by 0.400, and further by the absorbance recorded from step 19. This number was subtracted from the total volume of molasses solution with the result being the required volume of water to be added to the Molasses Solution. The water was added and the solution was mixed well. Steps 8-13 were repeated until three successive analyzed samples measured absorbance values (at 472 nm) between 0.390 and 0.410.

21. The solution was considered too light when the absorbance was less than 0.390. In such instances, more molasses may be added to the Molasses Solution. To determine the amount of molasses to be added, the volume of molasses solution was measured, multiplied by 0.640, and further by the absorbance recorded from step 19. This value was subtracted from the total volume of Molasses Solution, divided by 10, the result representing the amount (weight) of molasses that should be added to the Molasses Solution. The required amount of molasses was added into a small glass beaker. About 25 mL of the Molasses Solution was added to the beaker to dissolve the molasses. The beaker was heated on a hotplate to 90° C. and afterward cooled slightly. The contents were added to the Molasses Solution and mixed well. Steps 15-21 were repeated until three successive samples with absorbance values (at 472 nm) between were obtained, thereby yielding a Standardized Molasses Solution for subsequent use.

Sample Analysis

The samples were analyzed according to the following procedure:

1. A sample of carbon of unknown molasses number was provided and ground until 95% or more of it passed through a 325 mesh screen. If the sample was not from a recent production, it was dried at 150° C. to a constant weight prior to use. The Standard Carbon internal carbon standards were prepared in the same manner. An equal amount was pulverized to ensure that the fineness of the materials is equivalent.

2. 0.46±0.0002 gram portions of dried, pulverized carbon samples were weighed into separate clean and dry 400 mL beakers.

3. Filtration setups for sample filtration were prepared. A WHATMAN® No. 3 filter circle was placed in the Buchner funnel. The funnel was connected to the 250 mL filtering flask and the filtration vacuum was initiated. 50 mL of the filter paper suspension was added while making sure to coat the entire surface of the filter paper circle. After all the liquid was drained, the filtrate collected in the filtering flask was discarded.

4. 50 mL of the Standardized Molasses Solution was pipetted into the beaker containing the carbon to be analyzed. The beaker was swirled while adding the Standardized Molasses Solution until the carbon was thoroughly wetted.

5. The beaker was placed on the hotplate and the thermocouple or thermometer was placed in the beaker so the tip rests on the bottom of the beaker. The solution was heated until the thermocouple read 98° C. and a stopwatch was started. The thermocouple or thermometer was removed and the solution was allowed to boil for 30 seconds.

6. The sample was filtered by vacuum through a Buchner funnel using a WHATMAN® No. 3 filter paper which was previously prepared according to Step 3. The filter was covered with about 20 mL of the sample and this filtrate was discarded. The remaining portion was filtered.

7. The absorbance of the filtrate at a wavelength of 472 nm was measured and recorded, using the 2.5 mm fixed path KLETT™ Summerson Cell. Deionized or distilled water was used as reference.

8. The molasses number was calculated:

$$\text{Molasses Number} = (A \times B)/C$$

wherein A is the molasses number of the Standard Carbon (250 or other); B is the average absorbance of three determinations for the 250 Standard Carbon or other Standard Carbon; and C is the absorbance of the filtrate of the activated carbon being analyzed.

9. The Molasses Number was reported to the nearest increment of ten using conventional rounding techniques. (e.g. 226=230)

Example 1

Samples of 12×40 granular activated carbon for use in fixed or moving beds for the purification and decolorization of aqueous and organic liquids were prepared for Example 1. The samples were reagglomerated activated carbon formed from bituminous coal. The bituminous coal was first pulverized to a powder, followed by the addition of binder to the powder. The powder and binder were then reagglomerated into briquettes. Following briquetting, the briquettes were crushed and sized. Sizing retained only particle sizes between 12 mesh (1.70 mm hole size) and 40 mesh (0.425 mm hole size). Note that as described herein, mesh sizes are by US mesh size. The mean particle diameter of the sample batches was between 0.9 mm-1.1 mm, and the amount of granular activated carbon having a particle size greater than 12 mesh (1.70 mm) was no more than 5.0 wt. %. The amount of granular activated carbon having a particle size less than 40 mesh (0.425 mm) was no more than 4 wt. %. The crushed and sized particles were carbonized followed by thermal activation. Following thermal activation, the granular activated carbon of Example 1 has a moisture content of less than 2 wt. % when measured by ASTM D2867 and an abrasion number of 75 when measured by AWWA B604, and the apparent density as measured by ASTM D2854-09 was 0.49 g/cm$^3$.

Example 2

Samples of reagglomerated granular activated carbon were prepared in the same manner described in Example 1, except that the activation was performed such that the resulting product had an apparent density of 0.42 g/cm$^3$.

Example 3

Samples of reagglomerated granular activated carbon were prepared in the same manner described in Example 1, except that the activation was performed such that the resulting product had an apparent density of 0.38 g/cm$^3$.

Comparative Example 1 (C1)

Samples of granular activated carbon were prepared for Comparative Example 1. In Comparative Example 1, the samples were activated carbon formed from coconut shell. The coconut shells were first treated by slow pyrolysis to form a charcoal. Sizing was performed in accordance with ASTM D2862-16 to retain only particle sizes between 12 mesh (1.70 mm hole size) and 40 mesh (0.425 mm hole size). The amount of granular activated carbon having a particle size greater than 12 mesh (1.70 mm) was no more than 5 wt. %. The amount of granular activated carbon having a particle size less than 40 mesh (0.425 mm) was no more than 4 wt. %. The sized particles were next thermally activated. The hardness number of the resulting granular activated carbon as measured by ASTM D3802 was at least 95. The apparent density as measured by ASTM D2854 of the resulting granular activated carbon was 0.48 g/cm$^3$.

Comparative Example 2 (C2)

Samples of granular activated carbon were prepared for Comparative Example 2. In Comparative Example 2, the samples were reagglomerated activated carbon formed from bituminous coal. The bituminous coal was first pulverized to a powder, followed by the addition of binder to the powder. The powder and binder were then reagglomerated into briquettes. Following briquetting, the briquettes were crushed and sized. Sizing was performed in accordance with ASTM D2862-16 to retain only particle sizes between 12 mesh (1.70 mm hole size) and 40 mesh (0.425 mm hole size). The amount of particles having a size greater than 12 mesh (1.70 mm) was no more than 5 wt. %. The amount of particles having a size less than 40 mesh (0.425 mm) was no more than 4 wt. %. The crushed and sized briquettes were next carbonized and then thermally activated. The hardness number measured by ASTM D3802 was at least 75. The apparent density as measured by ASTM D2854 was 0.54 g/cm$^3$.

Comparative Example 3 (C3)

Samples prepared from a commercially sourced lignite based granular activated carbon were also tested. HYDRODARCO 4000 is a lignite-based granular activated carbon that is sized in accordance with ASTM D2862-16 to retain only particle sizes between 12 mesh (1.70 mm hole size) and 40 mesh (0.425 mm hole size). The amount of granular activated carbon having a particle size greater than 12 mesh (1.70 mm) was no more than 5 wt. %. The amount of granular activated carbon having a particle size less than 40 mesh (0.425 mm) was no more than 4 wt. %.

Comparative Example 4 (C4)

Samples prepared from a commercially sourced activated carbon were tested. The activated carbon of Comparative Example 4 is a granular activated carbon that is formed by the direct activation of bituminous coal.

Results

Examples 1-3 and Comparative Examples 1-4 were tested for effectiveness at removing specified per- and polyfluoroalkyl substances. Six beds, each consisting only of activated carbon of each of Examples 1-3 and Comparative Examples 1-3, were prepared according to ASTM D6586. Testing was performed according to EPA Method 537 Version 1.1 methodology, which measures the adsorption of contaminants on granular activated carbon in aqueous systems by way of the Rapid Small Scale Column Test (RSSCT) prepared as above. The water supply was passed through the beds and the concentration of per- and polyfluoroalkyl substances at the outlet was measured at designated intervals. To normalize the size of the beds, results are reported in "bed volumes," which is the volume of water that passed through the activated carbon beds divided by the volume of the beds themselves. During testing, the point where 25% of the concentration of the per- and polyfluoroalkyl substances "broke through" the activated carbon beds was noted. For a specified sorbent, higher bed volumes at 25% breakthrough means that the same amount of sorbent adsorbed a greater quantity of per- and polyfluoroalkyl substances and was therefore more effective.

In the results, PFOA is perfluorooctanoic acid (known also by the IUPAC nomenclature pentadecafluorooctanoic acid or simply C8). Examples 1-3 and Comparative Examples 1-4 were tested for the amount of water that could pass through a bed of the activated carbon before at least 25% of the concentration of the contaminant PFOA "broke through" the activated carbon bed, that is, was detected in the filtered water. The results are shown below in Table 3. Examples 1-3 and Comparative Examples 1-3 were also tested for the amount of water that could pass through a bed of the activated carbon before at least 25% of the concentration of the contaminant 4:2 FtS "broke through" the activated carbon bed. 4:2 FtS is 4:2 fluorotelomer sulfonic acid and is a PER- AND POLYFLUOROALKYL SUBSTANCES that has a low molecular weight, making it difficult to adsorb. Based on the testing of Examples 1-3 and Comparative Examples C1-C4, the following results were obtained:

TABLE 3

| Example | $\rho_b$ (g/cm³) | IV$_g$ (mg/g) | IV$_v$ (mg/cm³) | MN$_g$ | MN$_v$ | PFOA | 4:2 FtS |
|---|---|---|---|---|---|---|---|
| 1 | 0.49 | 1092 | 535 | 228 | 112 | 21740 | |
| 2 | 0.42 | 1278 | 537 | 435 | 183 | 38400 | |
| 3 | 0.38 | 1427 | 542 | 826 | 314 | 79750* | |
| C1 | 0.50 | 1174 | 586 | 134 | 67 | 2078 | |
| C2 | 0.54 | 1027 | 558 | 189 | 103 | 13596 | 98337 |
| C3 | 0.38 | 604 | 228 | 154 | 157 | 9156 | 14196 |
| C4 | 0.35 | 1018 | 356 | 288 | 101 | 4462 | 21443 |

Specification Testing: $\rho_b$, IV$_g$, IV$_v$, MN$_g$, MN$_v$
Performance Testing Bed Volume Equiv. at 25% Break-through: PFOA, 4:2 FtS

*extrapolated value

Figure 3:
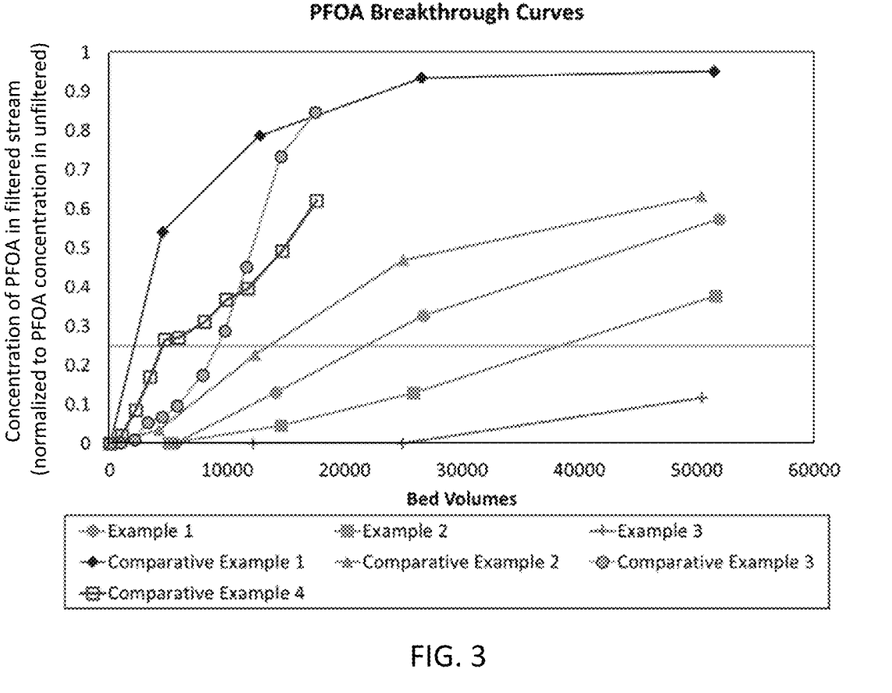
FIG. 3 provides a plot of perfluorooctanoic acid (PFOA) concentration measured in water at the exit port of a sorbent bed comprising sorbents of varying molasses numbers, normalized to the untreated water versus the number of bed volumes of water that passed through the bed.
Figure 4A:
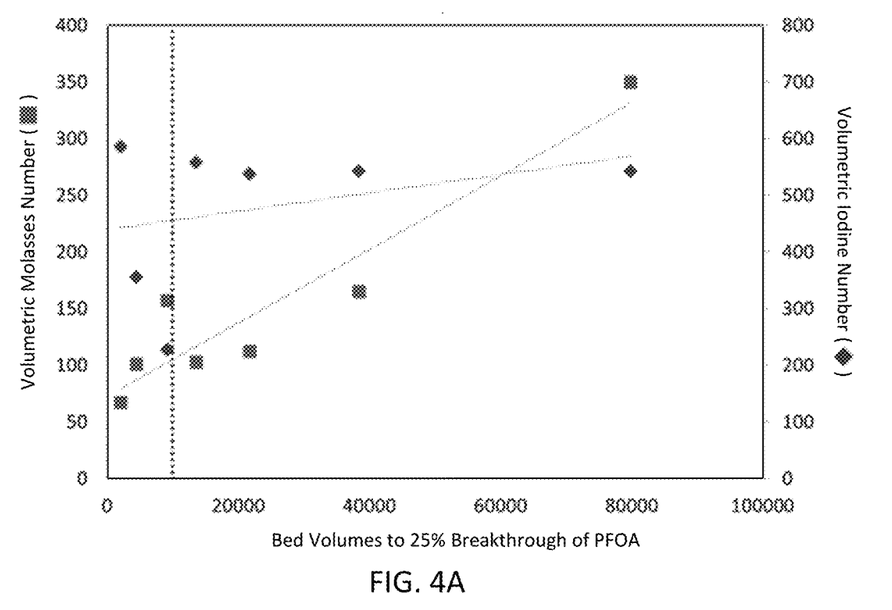
FIG. 4A provides a scatter plot of volumetric molasses number and the volume iodine number of various sorbents, as described herein, versus the bed volume equivalent when the concentration of PFOA in the water at the exit port of the bed reaches 25% of the PFOA concentration in the untreated water.
Figure 4B:
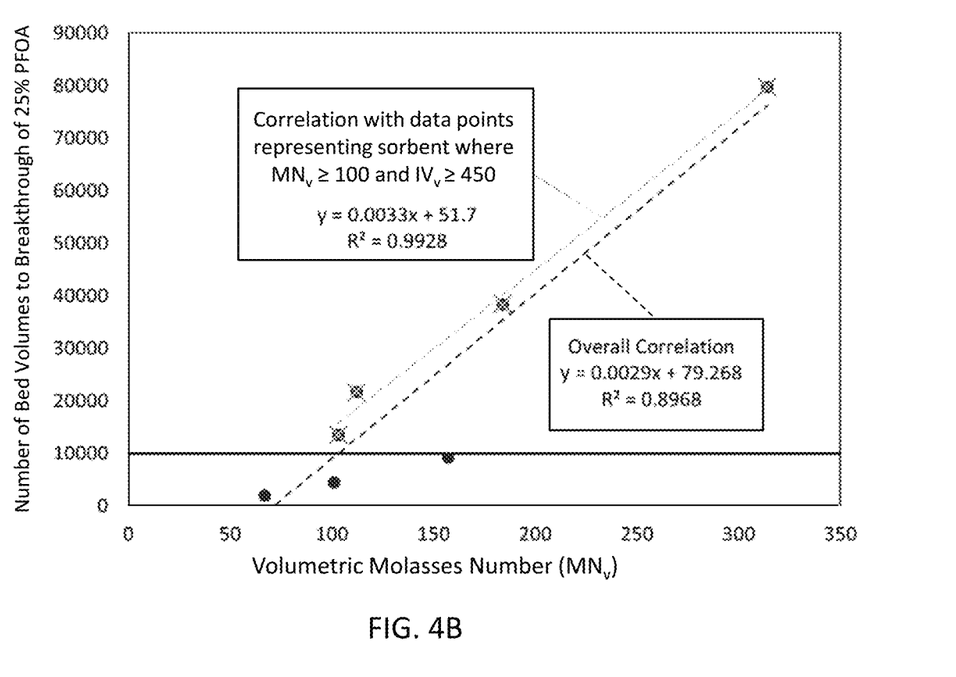
FIG. 4B provides a plot of the bed volume equivalent when the concentration of PFOA in the water at the exit port of the bed reaches 25% of the PFOA concentration in the untreated water as a function of the volumetric molasses number of the sorbent in the bed.

Results are also shown in FIGS. 3, 4A and 4B. FIG. 3 plots the normalized concentration of PFOA measured in the column effluent versus the number of bed volumes of water that pass through a bed of activated carbon sorbent. In these experiments, a concentration of PFOA was present in incoming water. The horizontal line corresponds to 25% of the initial concentration of PFOA measured at the exit port of the bed of activated carbon sorbent. Thus, in FIG. 3, the larger the portion of the plotted curve that is present below the horizontal line, the better the performance.

FIG. 4A plots on the horizontal axis the number of bed volumes until 25% of PFOA breaks through a bed of activated carbon sorbent. As described above, a concentration of PFOA was present in incoming water. Each vertical pair of data points represents a single experimental test. For example, the dotted vertical line represents a single material that was tested and exhibited 25% PFOA breakthrough at about 10,000 bed volumes. That material has a volumetric molasses number of about 160 cm⁻³ (represented by the square that is intersected by the vertical line) and a volume iodine number of about 250 mg/cm³ (represented by a diamond that is intersected by the vertical line). Lines of best fit are provided for both the volume iodine number and the volume molasses numbers corresponding to each sample.

FIG. 4B plots the bed volume equivalent at 25% of the PFOA measured at the exit port of the bed as a function of the volumetric molasses number of the samples. Each of the samples is the same as those shown in FIG. 4A. Two correlations were also found. First, an overall correlation was performed for all of the data points, which resulted in a $R^2$ value of 0.8968. This indicates a poor fit. However, the inventors also discovered that if a second correlation was performed for all data points excluding those data points having a volumetric iodine number of less than about 450 mg/cm³ and volumetric molasses number of less than about 100 cm⁻³, the $R^2$ value improved to 0.9928, indicating an excellent fit.

What is claimed is:

1. A sorbent for removing one or more perfluoroalkyl or polyfluoroalkyl substance (PFAS) from a fluid, comprising: activated carbon, reactivated carbon, or a combination thereof, wherein the activated carbon, reactivated carbon, or combination thereof is reagglomerated, the sorbent having a volumetric iodine number of about 450 mg/cm³ to about 600 mg/cm³ and a volumetric molasses number of about 150 cm³ to about 400 cm³, wherein a bed containing the sorbent can remove perfluorooctanoic acid from at least about 20,000 bed volumes of water containing a concentration of perfluorooctanoic acid of about 61 ng/L or less, thereby producing a filtered water stream, before a concentration of about 15 ng/L perfluorooctanoic acid is detected in the filtered water stream.

2. The sorbent of claim 1, wherein the volumetric iodine number is about 450 mg/cm³ to about 550 mg/cm³ and the volumetric molasses number is about 150 cm⁻³ to about 350 cm⁻³.

3. The sorbent of claim 1, wherein the activated carbon or reactivated carbon is formed from a precursor carbonaceous material selected from one or more of bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, and polymer fibers.

4. The sorbent of claim 1, wherein the activated carbon or reactivated carbon is formed from one or both of bituminous coal and sub-bituminous coal.

5. The sorbent of claim 1, wherein the volumetric iodine number is about 450 mg/cm³ to about 550 mg/cm³ and the volumetric molasses number is about 150 cm⁻³ to about 325 cm⁻³.

6. A method of removing one or more perfluoroalkyl and polyfluoroalkyl substances from a fluid, the method comprising:
providing a sorbent comprising: activated carbon, reactivated carbon, or a combination thereof, wherein the activated carbon, reactivated carbon, or combination thereof is reagglomerated, the sorbent having a volumetric iodine number of at least about 450 mg/cm3 to about 600 mg/cm3 and a volumetric molasses number of at least about 150 cm-3 to about 400 cm-3, and
contacting the fluid with the sorbent,
wherein a bed containing the sorbent can remove perfluorooctanoic acid from at least about 20,000 bed volumes of water containing a concentration of perfluorooctanoic acid of about 61 ng/L or less, thereby producing a filtered water stream, before a concentration of about 15 ng/L perfluorooctanoic acid is detected in the filtered water stream.

7. The method of claim 6, wherein the activated carbon or reactivated carbon is formed from a precursor carbonaceous material selected from one or more of bituminous coal, sub-bituminous coal, lignite coal, anthracite coal, wood, wood chips, sawdust, peat, nut shells, pits, coconut shell, babassu nut, macadamia nut, dende nut, peach pit, cherry pit, olive pit, walnut shell, wood, lignin, polymers, nitrogen-containing polymers, resins, petroleum pitches, bagasse, rice hulls, corn husks, wheat hulls and chaff, graphenes, carbon nanotubes, and polymer fibers.

8. The method of claim 6, wherein the activated carbon or reactivated carbon is formed from one or more of bituminous coal and sub-bituminous coal.

9. The method of claim 6, wherein the volumetric iodine number is about 450 mg/cm³ to about 550 mg/cm³ and the volumetric molasses number is about 150 cm⁻³ to about 350 cm⁻³.

10. The method of claim 6, wherein the sorbent has volumetric iodine number is about 500 mg/cm³ to about 550 mg/cm³ and the volumetric molasses number of about 150 cm⁻³ to about 325 cm⁻³.

11. The method of claim 6, wherein a bed containing the sorbent can remove PFOA from at least about 20,000 bed volumes of water containing a concentration of PFOA of about 61 ng/L or less, thereby producing a filtered water stream, before a concentration of about 15 ng/L PFOA is detected in the filtered water stream.

12. A sorbent composition comprising one or more sorbents having a volumetric iodine number of about 450 mg/cm$^3$ to about 600 mg/cm$^3$ and a volumetric molasses number of about 150 cm$^{-3}$ to about 400 cm$^{-3}$, and a second sorbent,
  wherein the one or more sorbents comprises reagglomerated activated carbon, reagglomerated reactivated carbon, or a combination thereof.

13. The sorbent composition of claim 12, further comprising one or more inert materials, fillers, binders, or other compositions that do not possess any appreciable sorbent capacity.

14. The sorbent composition of claim 12, wherein the volumetric iodine number is about 450 mg/cm$^3$ to about 550 mg/cm$^3$ and the volumetric molasses number is about 150 cm$^{-3}$ to about 350 cm$^{-3}$.

15. The sorbent composition of claim 12, wherein the volumetric iodine number is about 500 mg/cm$^3$ to about 550 mg/cm$^3$ and the volumetric molasses number is about 150 cm$^{-3}$ to about 350 cm$^{-3}$.

16. The sorbent composition of claim 12, wherein a bed containing the sorbent composition can remove perfluorooctanoic acid from at least about 20,000 bed volumes of water containing a concentration of perfluorooctanoic acid of about 61 ng/L or less, thereby producing a filtered water stream, before a concentration of about 15 ng/L perfluorooctanoic acid is detected in the filtered water stream.

* * * * *